(12) United States Patent
Houde-Walter

(10) Patent No.: US 11,598,608 B2
(45) Date of Patent: Mar. 7, 2023

(54) ENCODED SIGNAL DETECTION AND DISPLAY

(71) Applicant: LMD Applied Science, LLC, Rochester, NY (US)

(72) Inventor: Susan N. Houde-Walter, Rochester, NY (US)

(73) Assignee: LMD Applied Science, LLC, Rochester, NY (US)

(*) Notice: Subject to any disclaimer, the term of this patent is extended or adjusted under 35 U.S.C. 154(b) by 0 days.

(21) Appl. No.: 16/439,309

(22) Filed: Jun. 12, 2019

(65) Prior Publication Data

US 2019/0360779 A1 Nov. 28, 2019

Related U.S. Application Data

(63) Continuation of application No. 15/875,396, filed on Jan. 19, 2018, now Pat. No. 10,323,902, which is a
(Continued)

(51) Int. Cl.
| | |
|---|---|
| *F41G 1/35* | (2006.01) |
| *F41G 3/14* | (2006.01) |
| *F41G 7/22* | (2006.01) |
| *G01J 5/08* | (2022.01) |
| *G01J 5/07* | (2022.01) |

(52) U.S. Cl.
CPC ............... *F41G 1/35* (2013.01); *F41G 3/145* (2013.01); *F41G 7/226* (2013.01); *F41G 7/2293* (2013.01); *G01J 5/07* (2022.01); *G01J 5/0896* (2013.01)

(58) Field of Classification Search
CPC .... G01J 5/02; G01J 5/00; G02B 13/14; G02B 5/208
See application file for complete search history.

(56) References Cited

U.S. PATENT DOCUMENTS

| | | |
|---|---|---|
| 4,166,406 A | 9/1979 | Maughmer |
| 4,422,758 A | 12/1983 | Godfrey et al. |
| | (Continued) | |

OTHER PUBLICATIONS

Office action for U.S. Appl. No. 12/831,907, dated Oct. 3, 2013, Houde-Walter, "Encoded Signal Detection and Display", 10 pages.
(Continued)

*Primary Examiner* — Marcus H Taningco
(74) *Attorney, Agent, or Firm* — Lee & Hayes, P.C.

(57) ABSTRACT

A target marking system includes a light source emitting a thermal beam having a predetermined temporal modulation, and an optics assembly directing the thermal beam to impact a target, the target directing radiation to the optics assembly in response to the impact. A portion of the radiation having the predetermined temporal modulation. The target marking system further includes a detector configured to distinguish the portion of the radiation having the predetermined temporal modulation from a remainder of the radiation, the portion of the radiation passing to the director through the optics assembly. The system also includes a readout integrated circuit, the detector directing an input signal to the readout integrated circuit, and the readout integrated circuit producing a digitally enhanced output signal in response to receipt of the input signal.

22 Claims, 8 Drawing Sheets

Related U.S. Application Data continuation of application No. 15/350,477, filed on Nov. 14, 2016, now abandoned, which is a continuation of application No. 12/831,907, filed on Jul. 7, 2010, now Pat. No. 9,494,385.

(60) Provisional application No. 61/331,199, filed on May 4, 2010.

(56) References Cited

U.S. PATENT DOCUMENTS

| | | | |
|---|---|---|---|
| 4,713,544 A | 12/1987 | Grage | |
| 5,434,668 A | 7/1995 | Wootton et al. | |
| 5,481,433 A | 1/1996 | Carter | |
| 5,583,507 A | 12/1996 | D'Isepo et al. | |
| 5,966,227 A | 10/1999 | Dubois et al. | |
| 6,000,163 A | 12/1999 | Gordon | |
| 6,204,961 B1 | 3/2001 | Anderson et al. | |
| 6,362,872 B1 | 3/2002 | Berdanier | |
| 6,493,123 B1 | 12/2002 | Mansell et al. | |
| 7,492,806 B2 | 2/2009 | Day et al. | |
| 8,720,102 B2 | 5/2014 | Allen et al. | |
| 9,207,043 B2 | 12/2015 | Allen et al. | |
| 10,323,902 B2 * | 6/2019 | Houde-Walter | F41G 7/226 |
| 2002/0048307 A1 | 4/2002 | Schmidt | |
| 2003/0174315 A1 | 9/2003 | Byren et al. | |
| 2006/0005447 A1 | 1/2006 | Lenner et al. | |
| 2008/0304524 A1 | 12/2008 | Marsland, Jr. et al. | |
| 2009/0110019 A1 | 4/2009 | Houde-Walter et al. | |
| 2009/0190059 A1 * | 7/2009 | Ra | G06F 3/0425 349/58 |
| 2010/0090135 A1 * | 4/2010 | Kumar | G07C 5/085 250/566 |
| 2010/0127171 A1 * | 5/2010 | Jonsson | H04N 5/232939 250/330 |
| 2011/0036983 A1 | 2/2011 | Ford et al. | |
| 2011/0079713 A1 | 4/2011 | Kim et al. | |
| 2011/0227944 A1 * | 9/2011 | Feyereisen | G06T 11/00 345/632 |
| 2011/0252681 A1 | 10/2011 | Houde-Walter et al. | |
| 2011/0272580 A1 | 11/2011 | Houde-Walter | |
| 2011/0289810 A1 | 12/2011 | D'Souza et al. | |
| 2013/0061509 A1 | 3/2013 | Allen et al. | |
| 2014/0283430 A1 | 9/2014 | Allen et al. | |
| 2016/0084615 A1 | 3/2016 | Allen et al. | |
| 2017/0059279 A1 | 3/2017 | Houde-Walter | |
| 2018/0274885 A1 | 9/2018 | Houde-Walter | |

OTHER PUBLICATIONS

Final Office Action for U.S. Appl. No. 12/831,907, dated Dec. 10, 2014, Susan Houde-Walter, "Encoded Signal Detection and Display", 8 pages.

Office action for U.S. Appl. No. 12/831,907, dated Apr. 8, 2014, Houde-Walter, "Encoded Signal Detection and Display", 8 pages.

Office Action for U.S. Appl. No. 12/831,907, dated Jun. 16, 2015, Susan Houde-Walter, "Encoded Signal Detection and Display", 8 pages.

Office action for U.S. Appl. No. 15/350,477, dated Oct. 24, 2017, Houde-Walter, "Encoded Signal Detection and Display ", 10 pages.

Office Action for U.S. Appl. No. 15/875,396, dated Aug. 2, 2018, Houde-Walter, "Encoded Signal Detection and Display", 8 pages.

* cited by examiner

ENCODED SIGNAL DETECTION AND DISPLAY

CROSS-REFERENCE TO RELATED APPLICATIONS

This application is a continuation of U.S. patent application Ser. No. 15/875,396, filed Jan. 19, 2018, which is a continuation of U.S. patent application Ser. No. 15/350,477, filed Nov. 14, 2016, which is a continuation of U.S. patent application Ser. No. 12/831,907, filed Jul. 7, 2010 (now U.S. Pat. No. 9,494,385), which is a non-provisional of and claims the benefit of prior U.S. Provisional Patent Application No. 61/331,199, filed May 4, 2010. The entire disclosures of each of the above applications are hereby expressly incorporated herein by reference.

STATEMENT REGARDING FEDERALLY SPONSORED RESEARCH OR DEVELOPMENT

Not applicable.

REFERENCE TO A "SEQUENCE LISTING"

Not applicable.

BACKGROUND OF THE INVENTION

Field of the Invention

The present disclosure relates to systems and methods for marking a target using thermal radiation, and, in particular, to systems and methods of marking a target with an encoded thermal beam using a target marking system having a light source and a detector that both utilize a common optics assembly.

Description of Related Art

In combat arenas, some target marking applications may require use of radiation, such as a thermal beam, to mark targets in a way that may not be detectable by the target. For example, since thermal beams are not visible with the naked eye, a soldier or other user of a thermal target marking system may be able to identify and/or otherwise mark a potential target without the target being able to see, for example, a targeting dot on his person. However, use of thermal radiation to mark targets is not without its own inherent complications.

A quantum cascade laser ("QCL") may be utilized to emit thermal beams in such applications, however, because the beams emitted by QCLs are inherently divergent, employing a QCL in such applications typically requires additional componentry configured to shape the thermal beam. For example, known beam shaping techniques may be used to increase the resolution of the thermal beam, thereby allowing the beam to appear smaller when impinging upon the target. However, such shaping techniques typically reduce the intensity of the thermal beam. Thus, the resulting beam, although desirably narrower, may be difficult for thermal beam detectors to view at great distances. As a result, such marking systems may be undesirable for use by, for example, snipers or other medium to long-range combat applications.

The viewability/detectability of thermal beams emitted by QCLs may be improved by, for example, gating, phase locking, and/or other known techniques. Such techniques may enable the thermal beam detector to detect the presence of low intensity thermal beams at greater distances. However, utilizing thermal beam detectors configured for gating or phase locking, in conjunction with a QCL, may be difficult and cumbersome in combat arenas. For example, relatively large optical components may be required optically downstream of the QCL to facilitate the required shaping of the thermal beam. In addition, the thermal beam detector typically employs a second set of relatively large optical components to facilitate the requisite gating, phase locking, or other conditioning of the detected beam. Together, such components may be prohibitively large and heavy to be mounted to, for example, a typical firearm. In addition, such components may require, among other things, one or more electrical connections enabling communication between, for example, the QCL and the thermal beam detector components. Such connections are often facilitated by one or more wires extending between the QCL and the detector. Such wires can easily be disconnected or become caught on obstructions during use, further reducing the useability of such systems in combat arenas.

Thus, the need exists for a relatively light-weight, compact target marking system configured to emit a relatively narrow marking beam over long distances and to detect resulting radiation emitted by the impinged target.

SUMMARY OF THE INVENTION

In an exemplary embodiment of the present disclosure, a target marking system includes a light source emitting a thermal beam, an optics assembly directing the thermal beam to impact a target, and the target emitting radiation in response, and a detector positioned to detect the radiation emitted by the target, the radiation passing to the director through the optics assembly.

In such an exemplary embodiment, the optics assembly includes a catadioptric lens.

In such an exemplary embodiment, the light source includes a quantum cascade laser, the detector includes a focal plane array, and the optics assembly includes an amplitude filter.

In still another exemplary embodiment of the present disclosure, the optics assembly includes at least one lens, the at least one lens defines a central portion and an outer annulus surrounding the central portion. The central portion prohibits radiation from passing therethrough. In such an exemplary embodiment, a portion of the at least one lens is apodized, the outer annulus prohibits radiation having a wavelength less than approximately 2 μm from passing therethrough, the outer annulus is configured to reduce an intensity of the thermal beam, and the outer annulus is configured to reduce a width of the thermal beam.

In another exemplary embodiment of the present disclosure, the optics assembly includes an amplitude filter having a first portion and a second portion, the first portion prohibits passage of radiation having a wavelength between approximately 2 μm and approximately 30 μm, and the second portion prohibits passage of radiation having a wavelength less than approximately 2 μm. In such an exemplary embodiment, the target marking system includes a second light source. The light source emits the thermal beam at a wavelength between approximately 2 μm and approximately 30 μm, and the second light source emits a second thermal beam at a wavelength less than approximately 2 μm.

In addition, the first portion includes a different material than the second portion, and the amplitude filter includes an apodized aperture.

In still another exemplary embodiment, the optics assembly further includes a phase filter disposed within a path of the thermal beam.

In a further exemplary embodiment of the present disclosure, a radiation detection method includes passing a thermal beam from a light source through an optics assembly, impinging the thermal beam upon a target, the target emitting radiation in response, and passing the emitted radiation through the optics assembly to a detector.

Such an exemplary method further includes modulating the light source, wherein such modulation results in the thermal beam having a known temporal pattern. Such an exemplary method further includes controlling the detector to identify radiation characterized by the temporal pattern, and controlling functionality of individual detector pixels based on the temporal pattern. In such an exemplary embodiment, controlling the functionality of individual detector pixels includes color-coding at least one of the pixels to indicate the emitted radiation.

In such an exemplary method, modulating the light source includes varying an electrical current applied to the light source at a predetermined timed interval, and modulating the light source results in the thermal beam having a predetermined frequency pattern.

Such an exemplary method further includes controlling the detector to seek the emitted radiation for a fixed period of time. In such an exemplary method, the detector is controlled to identify the emitted radiation in response to receipt of a wireless signal, and the detector is controlled to identify the emitted radiation without regard to the temporal pattern.

In a further exemplary embodiment of the present disclosure, a target marking system includes a light source emitting a thermal beam having a predetermined temporal modulation and an optics assembly directing the thermal beam to impact a target. The target directs radiation to the optics assembly in response to the impact, and a portion of the radiation has the predetermined temporal modulation. The system also includes a detector configured to distinguish the portion of the radiation having the predetermined temporal modulation from a remainder of the radiation, and the portion of the radiation passes to the detector through the optics assembly. The system also includes a readout integrated circuit. The detector directs an input signal to the readout integrated circuit, and the readout integrated circuit produces a digitally enhanced output signal in response to receipt of the input signal.

In such an exemplary embodiment, the detector is an uncooled microbolometer array. Alternatively, or in addition, the detector includes an array of heat-sensitive pixels.

The system further includes a display operably connected to the detector. In such an exemplary embodiment, the detector includes a first array of pixels, and the display includes a second array of pixels corresponding to the first array of pixels. In addition, the readout integrated circuit directs the output signal to the display to control operation of at least one pixel of the second array of pixels, and the display modifies one of a color, contrast, brightness, and gain of the at least one pixel in response to receipt of the output signal. In such an exemplary embodiment, the display temporally modulates operation of the at least one pixel response to receipt of the output signal.

In further exemplary embodiments, the light source includes a quantum cascade laser, and the radiation includes at least one of re-emitted, reflected, and scattered radiation.

In another exemplary embodiment of the present disclosure, a radiation detection method includes passing a thermal beam having a predetermined temporal modulation from a light source through an optics assembly. The method also includes impinging the thermal beam upon a target, the target directing radiation to the optics assembly in response to the impact, and a portion of the radiation having the predetermined temporal modulation. Such an exemplary method further includes distinguishing the portion of the radiation having the predetermined temporal modulation from a remainder of the radiation, and displaying an image of at least a portion of the target in response to the distinguishing. At least a portion of the displayed image includes a digital enhancement corresponding to the predetermined temporal modulation.

Such an exemplary method also includes controlling functionality of individual display pixels based on the predetermined temporal modulation. In such an exemplary method, controlling the functionality of individual display pixels includes color-coding at least one of the pixels to indicate the portion of the radiation having the predetermined temporal modulation. In additional exemplary methods, passing the thermal beam includes varying an electrical current applied to the light source at a predetermined timed interval.

DETAILED DESCRIPTION OF THE DRAWINGS

Figure 1:
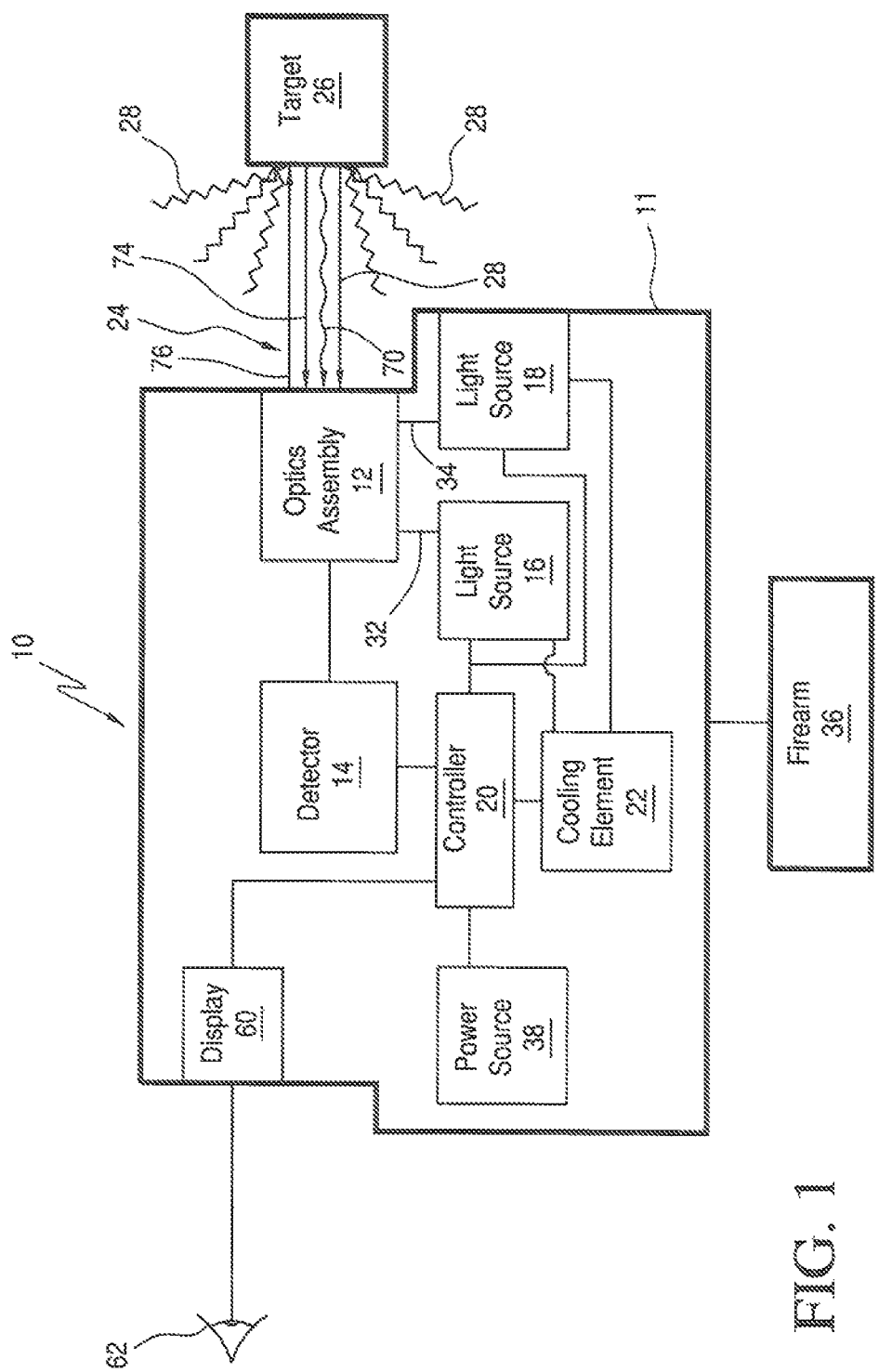
FIG. 1 is a schematic illustration of a target marking system according to an exemplary embodiment of the present disclosure.

FIG. 1 illustrates a target marking system 10 according to an exemplary embodiment of the present disclosure. As shown in FIG. 1, an exemplary system 10 may include, among other things, an optics assembly 12, a detector 14, and at least one light source 16. While exemplary embodiments of the system 10 may include a single light source 16, additional exemplary embodiments of the system 10 may include at least one additional light source 18. The detector 14 and the light sources 16, 18 may be optically, electrically, physically and/or otherwise connected to the optics assembly 12 in any known way. For example, the optical connection between the detector 14 and the optics assembly 12 may enable light and/or other forms of radiation to pass between the optics assembly 12 and the detector 14 along a beam path 30. In addition, the optical connection between the optics assembly 12 and the one or more light sources 16, 18 may enable light and/or other forms of radiation to pass between the optics assembly 12 and the light sources 16, 18 along respective beam paths 32, 34.

The target marking system 10 may further include, for example, a controller 20, a cooling element 22, and/or a power source 38. The controller 20 may be configured to control each of the components of the system 10, and the controller 20 may be electrically, and/or otherwise controllably connected to, for example, the detector 14, light sources 16, 18, cooling element 22, and/or power source 38 to facilitate such control. As will be described in greater detail below, the cooling element 22 may be thermally connected to at least one of the light sources 16, 18, and the power source 38 may be configured to provide power to the light sources 16, 18, controller 20, cooling element 22, detector 14, and/or other components of the target marking system 10. As shown in FIG. 1, the power source 38 may be electrically connected to one or more components of the target marking system 10 via the controller 20. In such an exemplary embodiment, the controller 20 may assist in distributing power from the power source 38 to the components of the system 10. Alternatively, one or more components of the system 10 may be directly connected to the power source 38.

The target marking system 10 may be configured for use in conjunction with and/or for removable connection to one or more handheld devices such as, for example, a firearm 36. Although not illustrated in FIG. 1, it is understood that the system 10 may further include one or more locking assemblies, clamping mechanisms, and/or other components configured to assist in removably attaching the system 10 to the firearm 36. Such locking assemblies or clamping mechanisms may enable the user to mount and/or otherwise connect the system 10 to any one of a plurality of commercially available mounts based on user preference. In an exemplary embodiment, the system 10 may be mounted on a Picatiny rail of the firearm 36. An additional exemplary embodiments, however, the system 10 may be connected to other known rails, such as, but not limited to dove tail rails and T-rails. In addition, the locking assembly and/or clamping mechanism may enable the system 10 to be easily removably attachable to other portions of the firearm 36 based on user preference or other ergonomic considerations.

The target marking system 10 may include a housing 11, and at least the first and second light sources 16, 18 may be disposed substantially within the housing 11. The housing 11 may define one or more orifices through which beams, pulses, signals, or other like radiation emitted from the light sources 16, 18 may exit the housing 11. In still another exemplary embodiment, the light sources 16, 18, optics assembly 12, and/or the detector 14 may be disposed substantially within the housing 11. In a further exemplary embodiment, each component of the system 10 may be disposed substantially within the housing 11 and, in such an exemplary embodiment, the system 10 may be a single-piece system removably connectable to the firearm 36.

Figure 12:
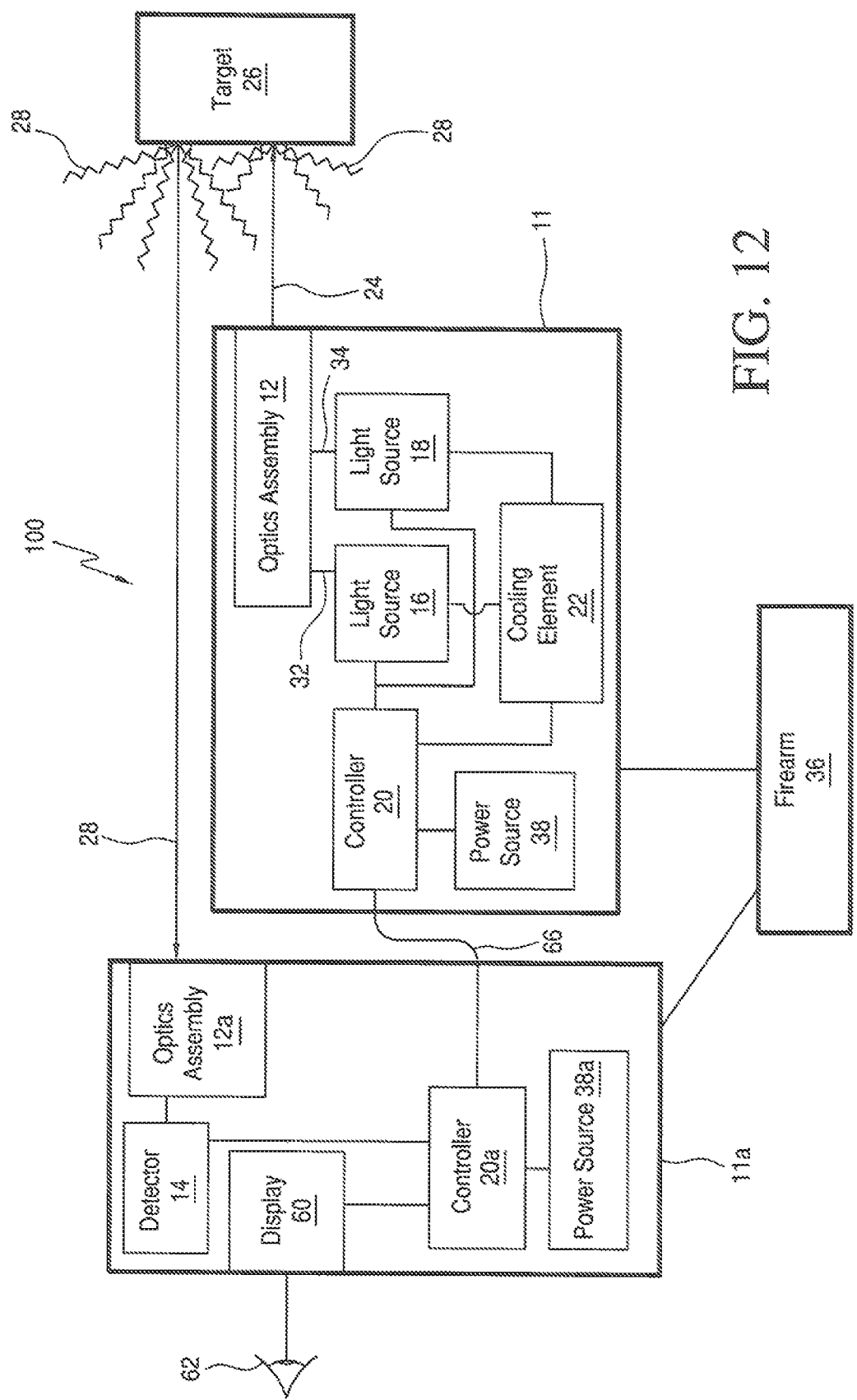
FIG. 12 is a schematic illustration of a target marking system according to another exemplary embodiment of the present disclosure.

As shown in FIG. 12, in a further exemplary embodiment, a target marking system 100 may comprise at least two housings containing the components of the system 100. Wherever possible, like components of the systems 10, 100 are described herein using like item numbers. The exemplary system 100 may have a first housing 11 containing at least a portion of a first optics assembly 12, the light sources 16, 18, the controller 20, the cooling element 22, and the power source 38. The exemplary system 100 may also comprise a second housing 11a containing at least a portion of a second optics assembly 12a, a second controller 20a, and a second power source 38a. The second housing 11a may further include, for example, the detector 14 and the display 60 described herein. It is understood that, in an exemplary embodiment, the second housing 11a, second optics assembly 12a, second controller 20a, and second power source 38a may be substantially optically, structurally, functionally, and/or operably similar to the respective housing 11, optics assembly 12, controller 20, and power source 38 described herein. In addition, although one or more elements of the above components may be disposed in separate housings 11, 11a, it is understood that together, these separate elements may comprise a single component of the system 100. For example, although the first optics assembly 12 may be disposed within the first housing 11 and the second optics assembly 12a may be disposed within the second housing 11a, in an exemplary embodiment, the first and second optics assemblies 12, 12a may comprise a single optics assembly of the system 100. Likewise, although the first controller 20 may be disposed within the first housing 11 and the second controller 20a may be disposed within the second housing 11a, in an exemplary embodiment, the first and second controllers 20, 20a may comprise a single controller of the system 100.

As shown schematically in FIG. 12, the first and second housings 11, 11a may be removably attachable to the firearm 36 using any of the locking assemblies, clamping mechanisms, rails, and/or other components described herein. In addition, the first and second controllers 20, 20a may be electrically and/or operably connected via any connection 66 known in the art. Such a connection 66 may be made by wire, Bluetooth, RF, and/or other known connection means. Accordingly, information, data, signals, and/or control commands may be transmitted between the controllers 20, 20a, via the connection 66, to facilitate operation of one or more components of the system 100.

For ease of description, the exemplary embodiment of the system 10 illustrated in FIG. 1 shall be described for the remainder of this disclosure unless otherwise specified. Light beams, pulses, signals, or other like radiation emitted from the light sources 16, 18 may exit the housing 11 and/or otherwise pass from the target marking system 10 along one or more respective emitted beam paths 24. Such radiation may impinge upon a target 26 and, depending upon the configuration of the target 26, such contact may result in the emission of radiation 28 from the target 26. This contact may also result in radiation 74 (FIG. 13) being rejected and/or otherwise reflected by the target 26, as well as radiation 70 (FIG. 13) being scattered by the target 26. Such re-emitted, reflected, and/or scattered radiation 28, 74, 70 may enter the housing 11 and/or the target marking system 10. In an exemplary embodiment, the target 26 may direct such radiation 28, 74, 70 to pass through the same optics assembly 12 used to condition the radiation emitted by the light sources 16, 18. The radiation 28, 74, 70 may pass from the optics assembly 12 to the detector 14 along the beam path 30. In this way, the target marking system 10 may utilize a single optics assembly 12 to condition the beams, pulses, signals, or other radiation 76 (FIG. 13) emitted from the light sources 16, 18, to condition re-emitted, reflected, and/or scattered radiation 28, 74, 70 directed to the optics assembly 12 by the target 26, and to direct such radiation 28, 74, 70 to the detector 14. Since the same optics assembly 12 is employed by the light sources 16, 18 and the detector 14, the target marking system 10 of the present disclosure may be significantly smaller, lighter, less complicated, less expensive, and easier to calibrate than marking systems utilizing discrete optics assemblies for the light sources and the detector associated therewith.

Figure 13:
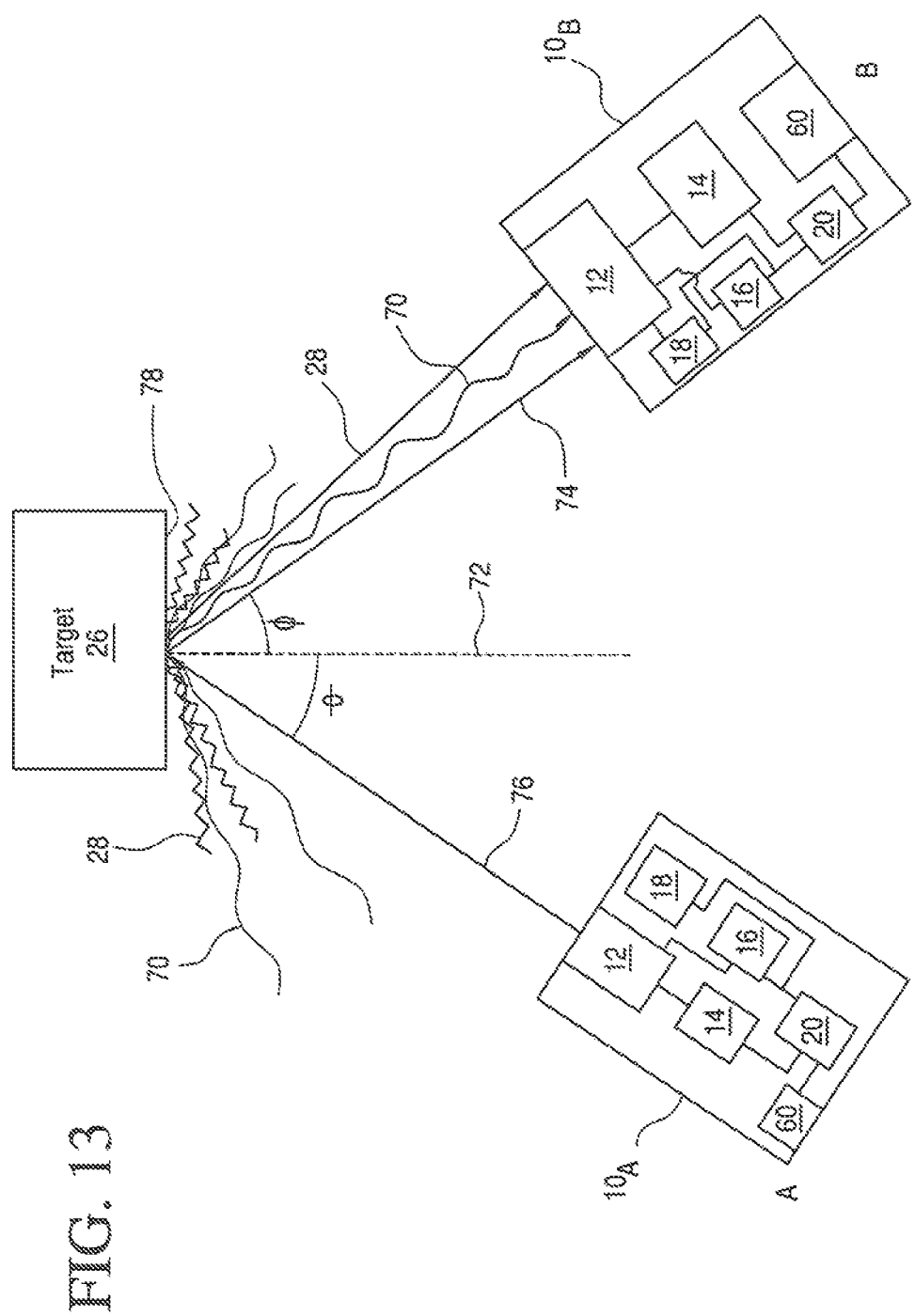
FIG. 13 is a schematic illustration of a target directing re-emitted, reflected, and scattered radiation according to an exemplary embodiment of the present disclosure.

For example, as shown in FIG. 13, radiation 76 may be emitted by light sources 16, 18 of a first target marking system 10A located at position A. The radiation 76 may impinge upon the target 26 at an incident angle θ relative to a normal axis 72 of an impinged surface 78. The target 26 may absorb at least a portion of the radiation 76, and the radiation 76 may heat at least a portion of the target 76. The interaction between the radiation 76 and the target 26 may cause the target 26 to emit the substantially non-directional re-emitted radiation 28. A portion of the re-emitted radiation 28 may pass through the optics assembly 12 of a second target marking system $10_B$, located at a position B different from position A, substantially as described with respect to the system 10 shown in FIG. 1.

In addition to the re-emitted radiation 28, the impinging radiation 76 shown in FIG. 13 may also produce reflected radiation 74 and scattered radiation 70. The reflected radiation 74 may be, for example, light or other electromagnetic radiation that has been rejected by the target 26, and such radiation 74 may be highly directional in nature. For example, the reflected radiation 74 may be directed from the surface 78 at reflected angle φ relative to the normal axis 72. In an exemplary embodiment, the reflected angle φ may be substantially equal to the incident angle θ. Scattered radiation 70, on the other hand, may be, for example, light or other electromagnetic radiation that has interacted with the target 26 and may not be substantially directional in nature.

In an exemplary embodiment, the re-emitted, reflected, and/or scattered radiation 28, 74, 70 may pass to the detector 14 of the second system 10B via the optics assembly 12 thereof. The detector 14 may or may not distinguish between the re-emitted, reflected, and/or scattered radiation 28, 74, 70. However, collection of the reflected and/or scattered radiation 74, 70 may be useful and/or otherwise beneficial in a variety of environments or conditions. For example, the impinging radiation 76 may heat the surface 78, and such heat may diffuse throughout the target 76. If such target heating occurs, impinging the surface 78 with radiation 76 having a known or predetermined temporal modulation pattern or signature will yield re-emitted radiation 28 having a different modulation pattern or signature. In essence, the temporal signature of the re-emitted radiation 28 will smear or wash-out as the target 26 heats. As a result, the re-emitted radiation 28 may be difficult, if not impossible, for the detector 14 to pick up.

However, the reflected and/or scattered radiation 74, 70 may have the same temporal signature as the impinging radiation 76, regardless of target heating or cooling. Thus, the detector 14 may be capable of picking up such radiation 74, 70 more easily than re-emitted radiation 28 in situations where the target 26 has been heated, or where the target temperature 26 is relatively close to a background temperature. It is understood that the ability of the detector 14 to pick up or otherwise detect re-emitted, reflected, and/or scattered radiation 28, 74, 70 may depend upon a number of additional factors including, but not limited to, for example, the incident angle θ, the absorption spectrum of the target 26, and the angle at which the radiation is detected.

Referring again to FIG. 1, the light sources 16, 18 may comprise, for example, any of a variety of lasers. Typically, the light sources 16, 18 are self-contained, and one or more of the light sources 16, 18 may include on or more dedicated lenses separate from the optics assembly 12. The light sources 16, 18, may comprise, for example, any combination of a green laser, a red laser, a QCL, and infra-red laser, and infra-red light emitting diode ("LED"), a white and colored LED, a laser having an output of approximately 5 mW (it is understood that lasers having an output greater than approximately 5 mW or less than approximately 5 mW may also be used), an interband cascade laser ("ICL"), and a short wavelength infra-red laser ("SWIR"). It is understood that a SWIR may emit a signal, beam, pulse, and/or other radiation having a wavelength of between, approximately 0.9 μm and approximately 2.5 μm. It is also understood that a QCL may be selected to operate in substantially ambient temperature conditions while producing a beam, pulse, signal, and/or other radiation having a wavelength of approximately 2 μm and approximately 30 μm. For example, a QCL may emit a beam having a wavelength between approximately 2 μm and approximately 5 μm (mid-wave) or between approximately 8 μm and approximately 30 μm (long-wave). In a further exemplary embodiment, the light sources 16, 18 may each comprise QCLs, thereby providing for a target marking system 10 configured to produce and/or otherwise emit beams having a plurality of different useful wavelengths for marking and/or other known applications. In still another exemplary embodiment, one or more of the light sources 16, 18 may comprise a carbon dioxide laser.

As shown in FIG. 1, any of the light sources 16, 18 employed by the target marking system 10 may be operably connected to an appropriate controller. The controller 20 may include an appropriate driver, a signal processor, and/or other controller components. Such a driver may be, for example, configured to assist in controllably operating the light sources 16, 18. In addition, such a signal processor may be configured to modify the gain, contrast, brightness, color, and/or other optical characteristics of an input signal received from the detector 14. Such an input signal may be representative of a change in resistivity and/or other thermal, mechanical, optical, or electrical characteristic of one or more components of the detector 14, and such components may be pixels thereof. Thus, the controller 20 may be configured to receive an input signal from the detector 14 and produce a digitally enhanced output signal in response to the input signal. The controller 20 may send the output signal to, for example, a liquid crystal diode screen, an organic light emitting diode, or any other like display 60. Alternatively, in additional exemplary embodiments, the detector 14 may be configured to produce such a digitally enhanced output signal, and direct such a signal to the controller 20 and/or the display 60.

The controller 20 and its components may be configured to operate at least one of the light sources 16, 18 in either pulsed or continuous modes of operation. Such components may include, one or more pulse generators, encoders, amplifiers, pulse switchers, and/or other known controller components. The controller 20 may control the light sources 16, 18 to emit radiation at any of the desirable wavelengths described herein. In addition, as will be described in greater detail below, the controller 20 may control the light sources 16, 18 to emit radiation at a desired pattern or frequency. Such encoding or other temporal modulation of the radiation emitted by the light sources 16, 18 may be accomplished by any known means such as, but not limited to, modulating the current and/or voltage supplied to the light sources 16, 18, or by passing the radiation emitted by the light sources 16, 18 through an electro-optic, electro-acoustic, or other known modulator prior to permitting the radiation to exit the target marking system 10.

For example, the controller 20 may control the light sources 16, 18 to emit a beam having a predetermined frequency signature. Such a frequency signature may be repeated at predetermined intervals as desired. Alternatively, the controller 20 may control the light sources 16, 18 to emit one or more beams having a specified predetermined frequency pattern for as long as the beam is emitted. It is understood that such periodic frequency signatures or unique specified frequency patterns may be randomly generated as is typical in known encoding applications. Such controllers 20 may also be configured to communicate with, for example, controllers of other target marking system, or with other hardware utilized in combat arenas, in order to synchronize the functionality of the respective light sources 16, 18 utilized in a particular target marking application. Thus, the controller 20 may enable the signature of the beam, pulse, signal, and/or other radiation emitted by the light sources 16, 18 to be preset, and for the signature, wavelength, frequency, pulse pattern, and/or other characteristics of the emitted beam to be easily tunable in the field and/or during use.

The housing 11 of the target marking system 10 may be, for example, substantially fluid tight, such that the light sources 16, 18, controller 20, and/or other components of the system 10 may be operable in wet conditions. In an exemplary embodiment, the system 10 may be rated for substantially complete submersion in a liquid for a period of a least 30 minutes. In such an exemplary embodiment, the liquid may comprise, for example, fresh water or salt water. The system 10 may also be configured to withstand a substantial level of shock, vibration, and/or other contact typical of rugged use. For example, the system 10 may be configured for use in harsh environments such as, for example, jungles, swamps, deserts, rocky terrain, and/or other law enforcement, combat, or self-defense environments.

Although not illustrated in FIG. 1, it is understood that the target marking system 10 may also include at least one selection device configured to enable the user to select which of the light sources 16, 18 to utilize for a particular application. Such an exemplary selection device may comprise a button, rotatable knob, and/or other operator interface configured to select one or more of the light sources 16, 18 for use.

Although not shown in FIG. 1, the target marking system 10 may further include an activation device to enable the user to activate one or more of the light sources 16, 18 during use. Such an activation device may have a configuration similar to a trigger or a depressible switch. In such an exemplary embodiment, the activation device may be configured to energize and/or otherwise activate one or more of the light sources 16, 18 in either a pulsed mode, a continuous mode, and/or other mode selected by the user. It is understood that the activation device and/or the selection device may enable use of more than one light source 16, 18 at the same time.

The power source 38 may be any source of power known in the art such as, for example, one or more batteries. In an exemplary embodiment, the power source 38 may comprise a plurality of AA batteries. The power source 38 may be, for example, disposable and/or rechargeable, and the power source 38 may be configured to supply power to one or more lasers, QCLs, and or other light sources 16, 18 of the type described above. As described above, the power source 38 may be operably connected to the controller 20, the light sources 16, 18, the detector 14, the cooling element 22, and/or any of the other target marking system components described herein. In additional exemplary embodiments, the power source 38 may comprise N-type batteries, and/or lithium-manganese dioxide batteries. Although FIG. 1 illustrates the power source 38 being disposed within the housing 11, in additional exemplary embodiments, the power source 38 may be disposed outside of the housing 11. In an exemplary embodiment, the power source 38 may disposed on and/or otherwise mounted to the firearm 36 to which the target marking system 10 is connected.

In an exemplary embodiment in which at least one of the light sources 16, 18, comprises a QCL, a cooling element 22 may be disposed in thermal contact with the QCL. Such a cooling element may be disposed within the housing 11 and, in additional exemplary embodiments, such cooling elements may be disposed outside of the housing 11 such as, for example, on a portion of the firearm 36 to which the target marking system 10 is connected. Regardless of its location, the cooling element 22 may be employed to maintain one or more of the QCLs described herein at a desirable operating temperature. Certain configurations of the cooling element 22 may require, for example, energy input. Thus, in an exemplary embodiment, at least a portion of the cooling element 22 may be operably connected to the power source 38.

The cooling element 22 may assist in cooling the QCL to a specified and/or desired operating temperature range. Additionally, the cooling element 22 may assist in cooling, for example, at least a portion of the housing 11 to a specified and/or desired operating temperature range. Such a portion of the housing 11 may include an internal compartment of the housing 11 and/or any desirable portion thereof. For example, the cooling element 22 may assist in cooling the QCL and/or a portion of the housing 11 to approximately room temperature, or between approximately 65 degrees Fahrenheit and approximately 75 degrees Fahrenheit. The cooling element 22 may comprise a thermal electric cooler or any other cooler known in the art. For example, the cooling element 22 may be either a passive device or an active device. Exemplary passive cooling elements 22 may include, for example, heat sinks, phase change elements, radiators, and/or one or more fins configured to dissipate thermal energy from the QCL. Active cooling elements 22, on the other hand, may include Peltier modules and/or Sterling devices. It is understood that in additional exemplary embodiments, the cooling element 22 may be omitted even if one or more QCLs are employed.

It is understood that the firearm 36 may comprise any hand gun, rifle, or other automatic or semi-automatic weapon known in the art. Such firearms 36 may be utilized in, for example, combat, law enforcement, self-defense, or other like applications. The target 26 illustrated in FIG. 1 may comprise any object at which the firearm 36 may be aimed and/or fired or otherwise discharged. Such targets may be animate objects, such as humans or animals, or inanimate objects, such as, for example, automobiles, security structures, or other objects typically targeted in the applications described herein.

Figure 11:
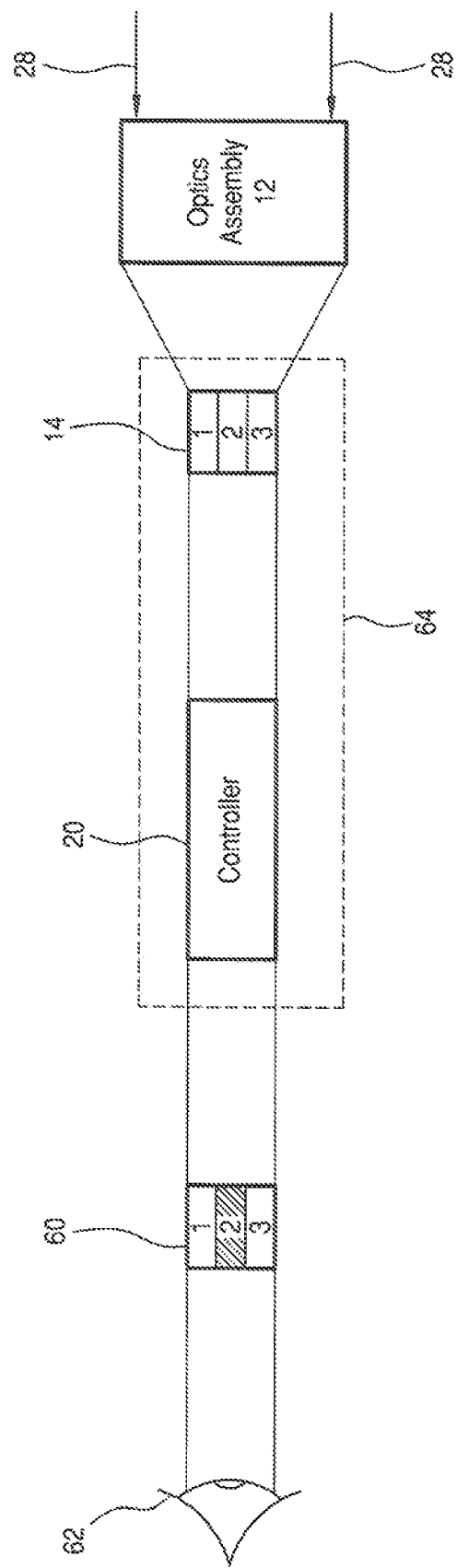
FIG. 11 is a partial schematic of the exemplary target marking system shown in FIG. 1.

The detector 14 may be any device or combination of devices configured to receive beams, pulses, signals, and/or other like radiation emitted, scattered, reflected, and/or otherwise directed by a target 26 and to interpret characteristics of the received radiation on a pixel-by-pixel basis. For example, the detector 14 may comprise a focal plane array such as, for example, a microbolometer array, or other like device having an array of pixels. Such a microbolometer array may be cooled or uncooled depending on the desired application. In an additional exemplary embodiment, the detector 14 may comprise a readout integrated circuit 64 (FIG. 11) or other like component configured to detect a temporally modulated thermal input and produce an enhanced digital output signal based on the detected thermal input. As shown in FIG. 11, in an exemplary embodiment, the readout integrated circuit 64 may comprise at least a portion of the detector 14 and/or the controller 20.

In an exemplary embodiment, radiation received by the detector 14 such as, for example, re-emitted, reflected, and/or scattered radiation 28, 74, 70 passing from the target 26 to the detector 14 may impinge upon the detector 14, thereby heating a portion of the detector 14 and changing the electrical resistance of the heated portion. This resistance change may be measured and processed by, for example, the controller 20 and/or the readout integrated circuit 64. For example, pixels of the detector array may be heat sensitive, and may exhibit a change in resistance when light having a wavelength between approximately 8 μm and approximately 20 μm or longer is incident thereon. This re-emitted, reflected, and/or scattered radiation 28, 74, 70 may be utilized to create an image of, for example, the portion of the target 26 impinged upon by the radiation emitted by the target marking system 10. The image may be shown on the display 60 so as to be viewable by a user 62.

Thus, the detector 14 may comprise a thermal sensor having an array of pixels that can be controlled to look for, seek, identify, and/or otherwise detect radiation having a known, encoded, predetermined, and/or otherwise specified temporal modulation pattern. Such a detector 14 may be configured to identify such a pattern and code pixels in its array, on a pixel-by-pixel basis, based on the detected pattern. The detector 14 may then send an input signal to the controller 20 or other components of the readout integrated circuit 64 for processing. The input signal may include information indicative of the resistance of each pixel of the detector 14 over time. Such information may include, for example, the intensity level detected by each pixel over time. The controller 20 or other components of the readout integrated circuit 64 may send an output signal to the display 60 indicative of and/or otherwise corresponding to the input signal. In an exemplary embodiment, the output signal may control the display 60 to modify the gain, contrast, brightness, color, and/or other characteristics of corresponding pixels of the display 60.

The display 60 may illustrate the modulation detected by the detector 14 in any manner that is easily identifiable by the user 62, regardless of the environment in which the system 10 is used. For example, the display 60 may comprise a pixel array corresponding to the pixel array of the detector 14. The pixel array of the display 60 may be configured to display a thermal image of the target 26. The pixels of the display 60 displaying the portion of the target 26 impinged upon by the thermal beam from the target marking system 10 may illustrate the point of impact of the beam using, for example, red, green, yellow, orange, or other colors. Such pixel-by-pixel color-coding may enable the user 62 to easily identify the point of impact when looking at the display 60. Alternatively, one or more pixels of the display 60 may blink, flash, or otherwise temporally modulate in any known easily identifiable way. As will be described in greater detail below, one or more pixels of the display 60 may be controlled according to one or more corresponding pixels of the detector 14. The detector 14 may further include additional display components to facilitate the pixel coding and target image display described herein.

The light sources 16, 18 may be controlled to emit radiation having a predetermined and/or specified temporal modulation pattern or signature, and such patterns or signatures may include periodic modulations or specified frequency patterns. The detector 14 may be controlled to identify any such temporal modulation patterns substantially instantaneously. In addition, such temporal modulation patterns can be rapidly and easily changed, using the controller 20 or other components of the systems 10 described herein, for operational security purposes. Such changes may occur, for example, during combat operations to reduce or eliminate the risk of enemy forces detecting the emitted, re-emitted, reflected, and/or scattered radiation 76, 28, 74, 70 discussed herein.

Thus, the components of the detector 14 may be controlled to seek, identify and/or look for, on a pixel-by-pixel basis, radiation having one of the predetermined and/or specified temporal modulation patterns discussed above using a gating process, a phase locking process, and/or other known processes. In such a gating process, the controller 20 may communicate to the detector 14 that a beam, signal, pulse, and/or other radiation has been emitted by the target marking system 10. In response, the detector 14 may attempt to locate and/or identify re-emitted, reflected, and/or scattered radiation 28, 74, 70 passing from the target 26, on a pixel-by-pixel basis, for a fixed period of time. Such gating processes may be initiated and/or otherwise effected due to a direct electrical connection between, for example, the controller 20 and the detector 14. Alternatively, such gating processes may be initiated and/or otherwise effected upon receipt of a wireless signal and/or trigger. Such a wireless signal may be, for example, a blue tooth and/or other like signal, and at least one of the controller 20 and the detector 14 may be configured to receive such a signal for effecting a gating process.

In a phase locking process, on the other hand, the detector 14 may be controlled to identify re-emitted, reflected, and/or scattered radiation 28, 74, 70 passing from the target 26 having a predetermined and/or specified temporal modulation pattern without being notified that the target marking system 10 has emitted a beam, signal, pulse, and/or other radiation. Instead, the detector 14 may detect and/or process all radiation passing thereto, and may determine whether any of the incoming radiation exhibits, for example, the predetermined and/or specified temporal modulation pattern, or other identifiable characteristics. If the incoming radiation does exhibit such a pattern or characteristic, the display 60 may be controlled to display, for example, a thermal image of the target 26 with the impact point of the thermal beam emitted by the target marking system 10 being color-coded in the image. It is understood that the gating, phase locking, and/or other like processes described herein may be employed on a pixel-by-pixel basis in embodiments of the detector 14 having pixel arrays or other like components. Moreover, the gating, phase locking, and/or other like processes described herein may be performed without performing the beam shaping processes described herein.

Figure 9:
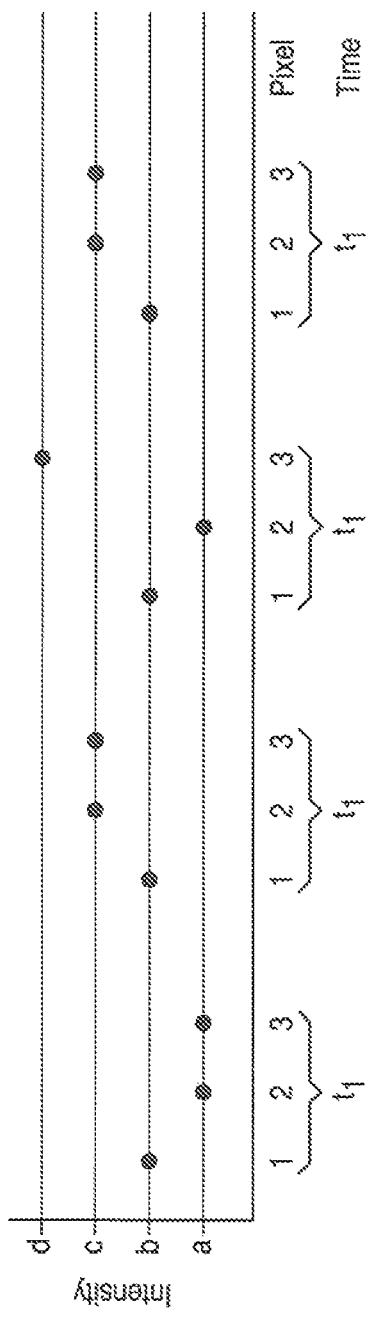
FIG. 9 is an intensity diagram according to an exemplary embodiment of the present disclosure.
Figure 10:
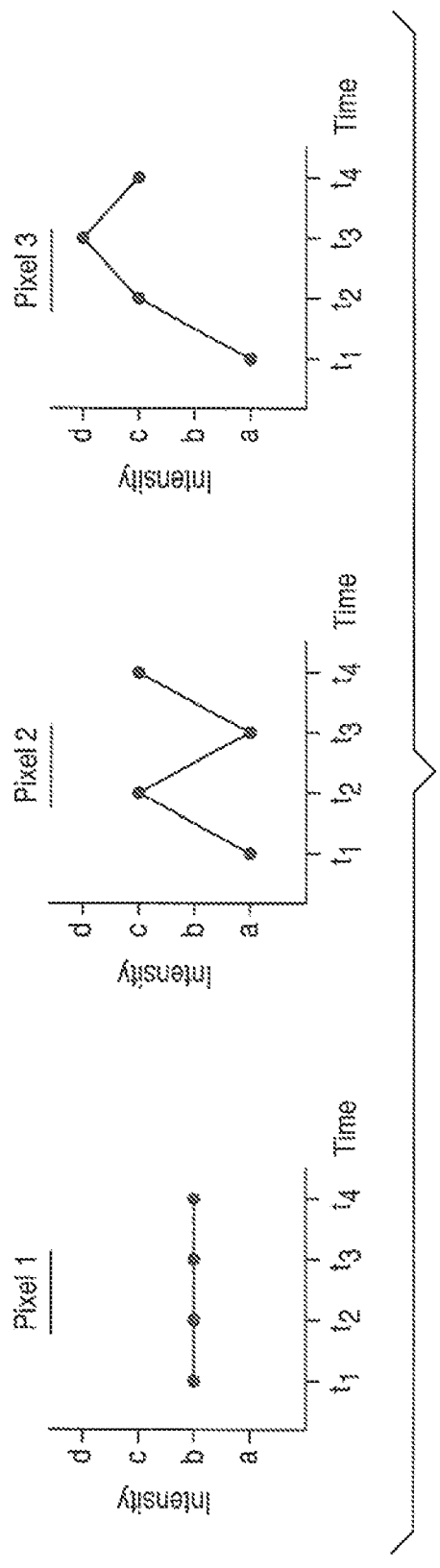
FIG. 10 illustrates individual pixel intensity diagrams corresponding to the intensity diagram of FIG. 19.

An exemplary pixel-by-pixel imaging process may be illustrated with reference to FIGS. 9-11. FIG. 9 illustrates an exemplary intensity diagram corresponding to an exemplary three-pixel array of the detector 14. In other embodiments, an array of the detector may have many thousands of pixels, however, the operation of a three-pixel array will be described herein for ease of description. In the exemplary embodiment of FIG. 9, the radiation emitted by the light sources 16, 18 may be encoded such that re-emitted, reflected, and/or scattered radiation 28, 74, 70 passing from the target 26 has a modulated intensity pattern from time $t_1$ to $t_4$. For example, pixel 1 has a constant intensity b at time $t_1$ to $t_4$, while pixel 2 has an intensity a at $t_1$, an intensity c at $t_2$, an intensity a at $t_3$, and an intensity c at $t_4$. Exemplary pixel 3 has an intensity a at $t_1$, an intensity cat $t_2$ and $t_4$, and an intensity d at $t_3$. These temporal intensity modulations are illustrated, on a pixel-by-pixel basis, in FIG. 10. In such an exemplary embodiment, pixels of the detector 14 may be controlled to detect encoded re-emitted, reflected, and/or scattered radiation 28, 74, 70 having an intensity pattern a, c, a, c over a time interval $t_1$ to $t_4$. Accordingly, in such an exemplary embodiment, pixel 2 of the detector 14 may be tagged as detecting the encoded radiation 28, 74, 70.

As shown schematically in FIG. 11, the detector 14 may send an input signal to the controller 20 and/or the readout integrated circuit 64 indicating that pixel 2 has been tagged, and the controller 20 and/or the readout integrated circuit 64 may send a corresponding output signal to the display 60. The output signal may control a corresponding pixel 2 of the display 60 to appear digitally enhanced in any of the colorized, temporally modulated, or other easily identifiable ways described above. Such an exemplary enhancement is illustrated by the cross-hatched pixel 2 of the display 60 shown in FIG. 11, and this enhancement may be easily seen by the user 62 viewing the display 62. Alternatively, more than one pixel of the display 60 may correspond to pixel 2 of the detector 14, and each of these more than one display pixels may be controlled as described above.

Figure 2:
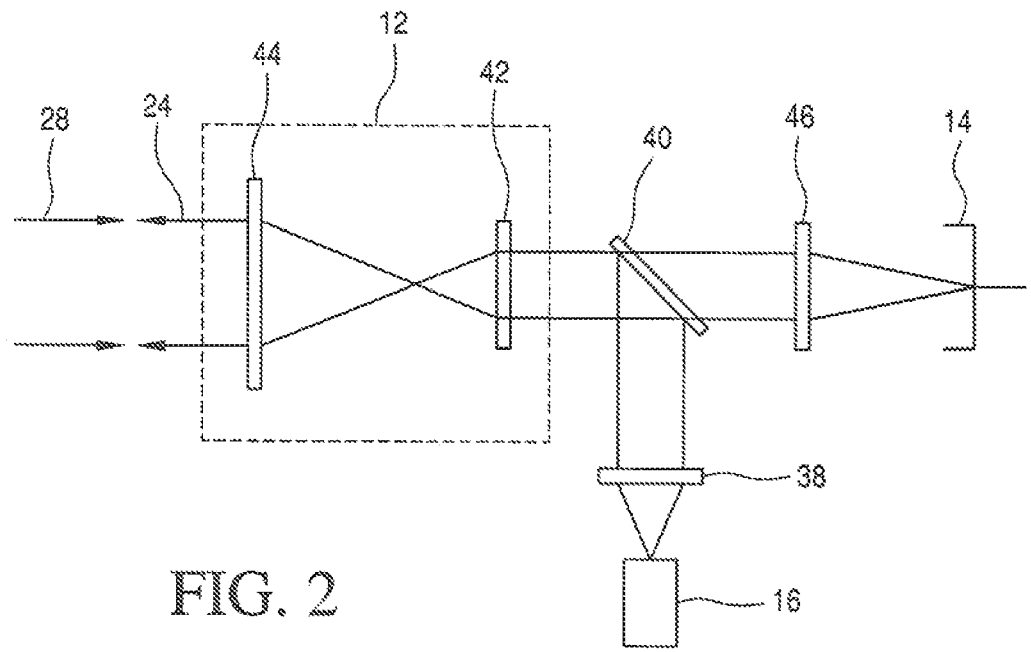
FIG. 2 is a partial schematic of a portion of an exemplary target marking system.
Figure 3:
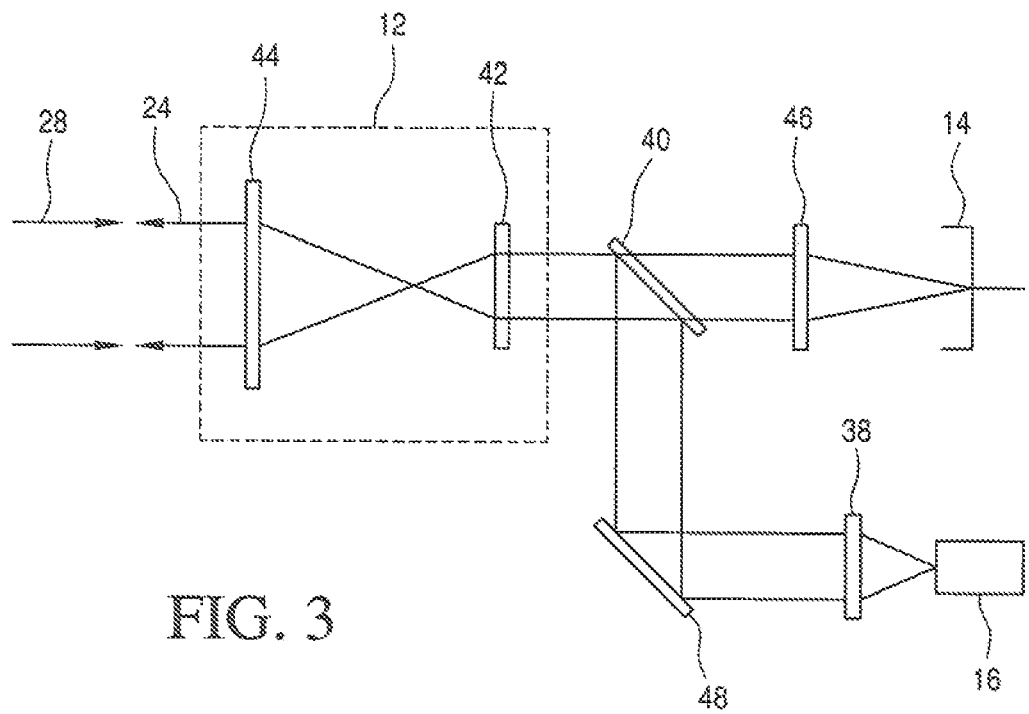
FIG. 3 is a partial schematic of a portion of another exemplary target marking system of the present disclosure.
Figure 4:
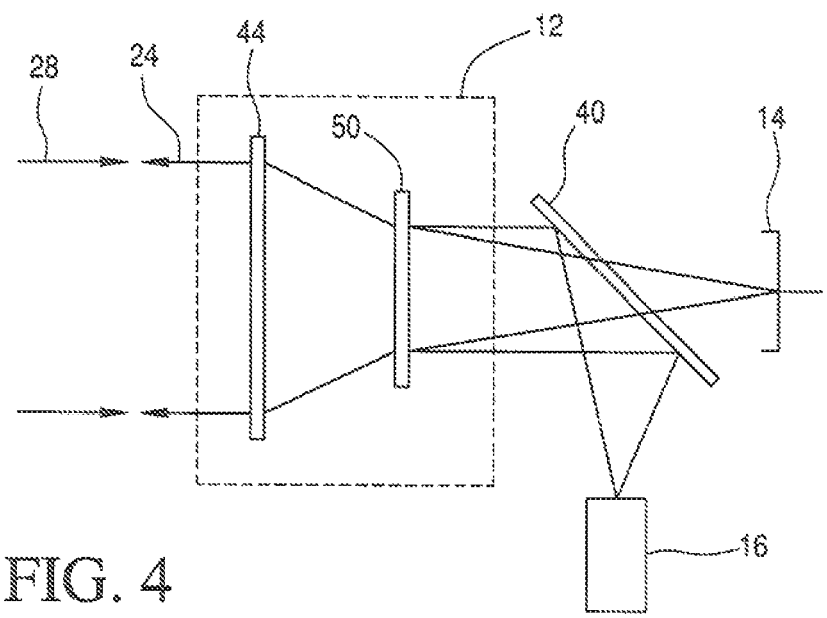
FIG. 4 is a partial schematic of a portion of still another exemplary target marking system of the present disclosure.

With continued reference to FIG. 1, the optics assembly 12 may comprise one or more optical components such as, for example, one or more lenses, beam splitters, mirrors, and/or other known optical components configured to direct, shape and/or otherwise control the passage of radiation there through. For example, the optics assembly 12 may be configured to collect as much re-emitted, reflected, and/or scattered radiation 28, 74, 70 as possible and to direct the collected radiation 28, 74, 70 to the detector 14. Such radiation may include, for example, any beams, pulses, signals, and/or other radiation omitted by the light sources 16, 18 in the thermal and/or other spectral band, as well as the re-emitted, reflected, and/or scattered radiation 28, 74, 70 received from the target 26. As described above, the target marking system 10 may comprise a single optics assembly 12 that is shared by the light sources 16, 18 and the detector 14. As shown in FIG. 2, the optics assembly 12 may include, for example, one or more lenses 42, 44. The optics assembly 12 may be, for example, a focal power changer, a camera objective, a catadioptric lens, or any other known light collection system. Although not illustrated in FIG. 2, it is understood that the optics assembly 12 may further comprise additional lenses, apertures, filters, modulators, and/or other optical components to facilitate the beam shaping techniques described herein. The embodiments illustrated in FIGS. 2-4 are merely exemplary, and the optics assembly 12 may have any configuration or collection of components necessary to perform the functions/uses described herein. In an additional exemplary embodiment, the optics assembly 12 may comprise any known zoom system. In further exemplary embodiments, the optics assembly 12 may also include, for example, at least one of the collimating lens 38, beam splitter 40, and imaging lens 46 illustrated in FIG. 2.

For ease of description, only a single light source 16 is illustrated in FIG. 2 through FIG. 4, however, it is understood that two or more light sources 16, 18 may be configured to utilize the single optics assembly 12 described herein. In addition, for ease of illustration, only re-emitted radiation 28 is shown in FIGS. 2, 3, 4, and 6, however, it is understood that the reflected and/or scattered radiation 74, 70 may follow substantially the same path as the illustrated re-emitted radiation 28. As shown in FIG. 2, the light source 16 may initially emit a widely divergent beam, and such a beam may be passed through the collimating lens 38 such that substantially all radiation emitted by the light source 16 may impinge upon the beam splitter 40. The beam splitter 40 may be positioned at any desirable angle relative to the light source 16 such that the collimated beam impinging thereon may be directed to, for example, the lens 42 of the optics assembly. This first lens 42 may be, for example, any catadioptric lens, refracting lens, reflecting lens, defracting lens, or other lens known in the art. Thus as shown in FIG. 2, the beam passing through the first lens 42 may converge optically upstream of the lens 44, and the beam impinging upon the second lens 44 from the first lens 42 may be wider at the second lens 44. The second lens 44 may be, for example, any catadioptric lens, refracting lens, reflecting lens, defracting lens, or other lens known in the art, and the second lens 44 may output the emitted beam 24 from the optics assembly 12 and/or from the target marking system 10.

Once re-emitted, reflected, and/or scattered radiation 28, 74, 70 reaches the optics assembly 12, the radiation 28, 74, 70 may pass through the lens 44 and may converge optically upstream of the lens 42. The lens 42 may assist in collimating the radiation 28, 74, 70 and may direct the radiation 28, 74, 70 through the beam splitter 40 to the imaging lens 46. The imaging lens 46 may focus the image onto the detector 14 by converging the radiation 28, 74, 70 upon the detector 14 for detection, identification, and/or viewing purposes. Thus, the detector 14 may be disposed substantially at the focal point of the radiation 28, 74, 70 passing through the imaging lens 46.

Additional configurations of these and other optical components may be utilized by target marking systems 10 of the present disclosure. For example, as shown in FIG. 3, in an additional exemplary embodiment, a beam, pulse, signal, and/or other radiation emitted by the light source 16 may be reflected by a mirror 48 onto the beam splitter 40 once such radiation is collimated by a collimating lens 38. Moreover, as shown in FIG. 4, in an additional exemplary embodiment of the present disclosure, a divergent beam of radiation emitted by the light source 16 may be impinged directly onto a beam splitter 40 without the use of an intermediate collimating lens. The beam splitter 40 may direct this divergent beam to, for example, a refracting lens 50 of the optics assembly 12. The refracting lens 50 may, thus, direct a divergent beam of radiation to the lens 44, which may collimate the divergent beam before the emitted beam 24 passes from the optics assembly 12. With continued reference to FIG. 4, the re-emitted, reflected, and/or scattered radiation 28, 74, 70 received by the lens 44 may converge upon the refracting lens 50, and the lens 50 may direct the re-emitted radiation through the beam splitter 40 to converge upon the detector 14.

In addition to the components illustrated in FIG. 4, the optics assembly 12 may further comprise at least one aperture 56 to assist in conditioning and/or otherwise shaping the radiation emitted by the light source 16. In an exemplary embodiment, at least one of the lenses 42, 44 may comprise an aperture. However, in an additional exemplary embodiment, an aperture 56 may be utilized in addition to the components illustrated in the embodiments of FIGS. 2-4.

An exemplary aperture 56 may be disposed anywhere in the beam path 32, 34 between the light sources 16, 18 and the optics assembly 12, or anywhere in the beam path 30 between the optics assembly 12 and the detector 14 (FIG. 1). In an exemplary embodiment, an aperture 56 may comprise, for example, an amplitude filter of any known configuration. An exemplary aperture 56 may comprise a first portion 54 proximate a center of the aperture 56, and a second portion 52 surrounding the first portion 54.

Figure 5:
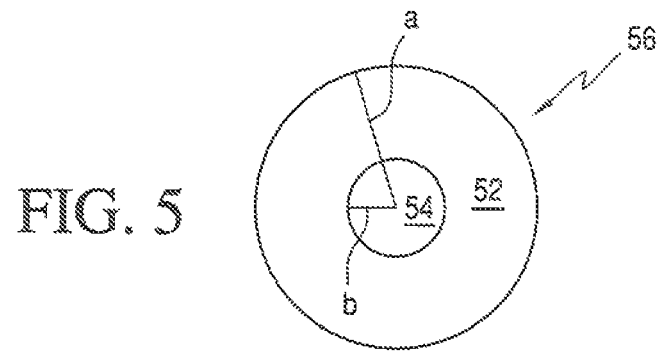
FIG. 5 illustrates an amplitude filter according to an exemplary embodiment of the present disclosure.

As shown in FIG. 5, the second portion 52 may be substantially annular and may have a radius a, and the first portion 54 may be substantially circular and may have a radius b. In an exemplary embodiment, the second portion 52 may be configured to permit passage of radiation having a wavelength between approximately 2 μm and approximately 30 μm. Such radiation may be within the QCL band. In such an exemplary embodiment, the second portion 52 may be substantially clear and/or transparent. In such an exemplary embodiment, the first portion 54 may prohibit all radiation from passing therethrough.

It is understood that such an aperture 56 may be configured to reduce, for example, the intensity of the emitted beam 24. In addition, such an aperture 56 may be configured to reduce the width of the emitted beam 24, thereby reducing the diameter of the thermal beam impinging upon the target 26 (FIG. 1). The reduced intensity of the resulting emitted beam 24 may be compensated for by using, for example, the gating or phase locking techniques discussed above. It is also understood that the first portion 54 of the aperture 56 may be made from a different material than the second portion 52. For example, while the first portion 54 may be made from any material configured to substantially block all radiation from passing therethrough, the second portion 52 may be made from at least one of Ge, ZnSe, ZnS, or chalcogenide.

Figure 6:
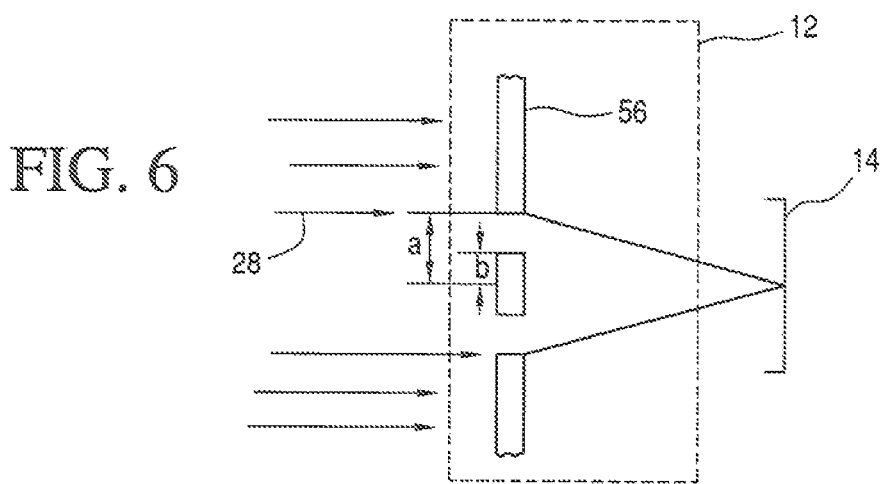
FIG. 6 is a partial schematic of a target marking system including an amplitude filter according to an exemplary embodiment of the present disclosure.

In another exemplary embodiment of the present disclosure, the first portion 54 of the aperture 56 may comprise an obscuration configured to permit passage of all radiation except for radiation having a wavelength within the QCL band. In particular, in such an exemplary embodiment, the first portion 54 may prohibit passage of radiation having wavelength between approximately 2 μm and approximately 30 μm. In such an exemplary embodiment, the second portion 52 may permit passage of radiation having a wavelength between approximately 2 μm and approximately 30 μm. Thus, the second portion 52 may prohibit passage of radiation having, for example, a wavelength less that 2 μm. Such an aperture 56 may be utilized for target marking systems 10 comprising more than one light source 16, 18. In particular, such apertures 56 may be convenient for fusion applications in which it may be desirable to emit multiple beams of radiation having different wavelengths. In such an exemplary embodiment, a radiation beam having a relatively short wavelength may be passed through the first portion 54, and a second beam having a relatively longer wavelength may be permitted to pass through the outer portion 52. FIG. 6 further illustrates an exemplary embodiment in which an aperture 56 is utilized within the optics assembly 12, and in FIG. 6, additional optical components of the optics assembly 12 and the target marking system 10 have been omitted for clarity.

The impulse response in optics assemblies utilizing amplitude filters such as the aperture 56 described above, is well-known in the art. The intensity (I) can be represented by the relationship:

$$I \propto \left| \frac{J_1\left(\frac{kar}{z}\right)}{\left(\frac{kar}{z}\right)} - \frac{J_1\left(\frac{kbr}{z}\right)}{\left(\frac{kbr}{z}\right)} \right|^2,$$

wherein $J_1$ is a Bessel function of the first kind, order 0, and the above relationship assumes a point light source 16.

Figure 7:
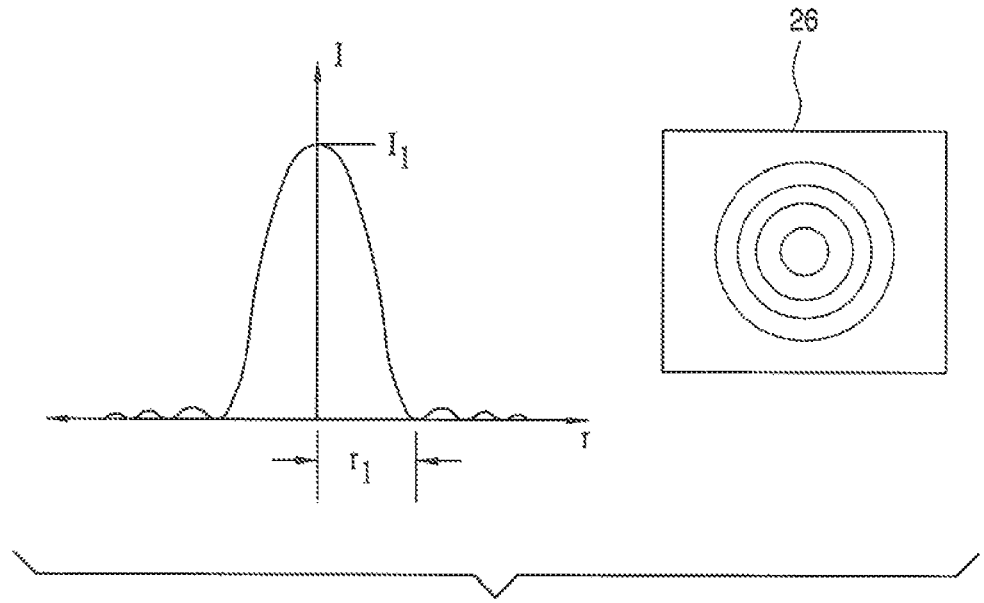
FIG. 7 is an intensity diagram corresponding to an exemplary embodiment of the present disclosure.
Figure 8:
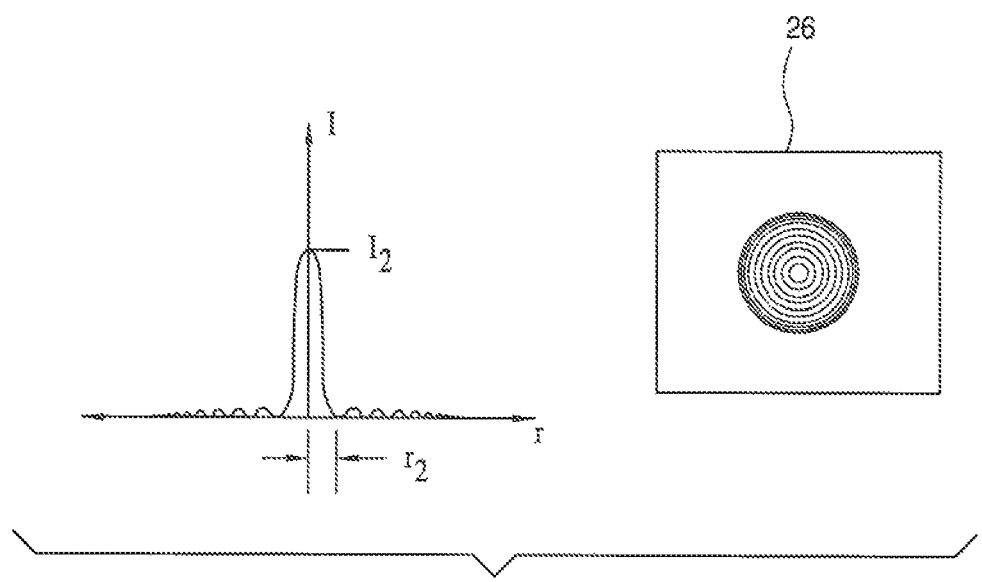
FIG. 8 is an intensity diagram corresponding to another exemplary embodiment of the present disclosure.

Moreover, FIG. 7 illustrates a graphical representation of intensity versus radius for a target marking system 10 that does not employ an aperture 56 of the type described above. FIG. 8, on the other hand, illustrates a graphical representation of intensity versus radius for a target marking system 10 that does employ an aperture 56 of the type described above. As can be seen by comparing the signal intensity $I_1$ shown in FIG. 7 to the signal intensity $I_2$ shown in FIG. 8, employing an aperture 56 decreases the overall signal intensity of the emitted beam 24. However, the aperture 56 enables target marking systems 10 employing an aperture 56 to obtain a narrower central maximum than systems in which such an aperture 56 is not utilized. Such is illustrated by the images of the target 26 shown in FIGS. 7 and 8, respectively.

As is also illustrated in FIGS. 7 and 8, utilizing an aperture 56 may increase the level of diffraction ringing seen on thermal images of the target 26. It is understood that, to reduce the level of diffraction ringing one or more apodization filters may be utilized. Such filters may assist in gradually increasing the amount of radiation that passes through the aperture 56. Alternatively, portions of the aperture 56 may be apodized to have the same effect. In addition, it is understood that one or more phase filters may be utilized within the target marking system 10 for additional beam shaping functionality. For example, instead of blocking a portion of the re-emitted, reflected, and/or scattered radiation 28, 74, 70, such filters may desirably modify the way in which the radiation comes into focus at, for example, the focal point and/or the detector 14. For ease of illustration, only re-emitted radiation 28 has been shown in FIGS. 2, 3, 4, and 6.

The invention has been described in detail with particular reference to a presently preferred embodiment, but it will be understood that variations and modifications can be effected within the spirit and scope of the invention. The presently disclosed embodiments are therefore considered in all respects to be illustrative and not restrictive. The scope of the invention is indicated by the appended claims, and all changes that come within the meaning and range of equivalents thereof are intended to be embraced therein.

The invention claimed is:

1. A system, comprising:
   a housing defining an orifice;
   a controller configured to control emission of a beam of thermal radiation from the housing, via the orifice, and toward an object disposed at a location external to the housing;
   an optics assembly supported by the housing, the optics assembly configured to receive, via the orifice, at least part of the thermal radiation directed to the optics assembly from the location;
   a detector having a field of view and being controlled to identify the at least part of the thermal radiation received by the optics assembly, and to provide an input signal to the controller based on the identified at least part of the thermal radiation; and a display operably connected to the controller, the controller being configured to:
  generate an output signal, the output signal being based on:
    the input signal, and
    a characteristic of the beam of thermal radiation, as emitted from the housing, determined independent of the at least part of the thermal radiation, and
  provide the output signal to the display,
  the display being configured to display an image based on the output signal, the image illustrating:
    the object, and a point of impact of the beam on the object, in accordance with the input signal; and
    a visual representation of the beam of thermal radiation emitted from the housing, the visual representation:
      being illustrated in the image as passing, from the object, at least partly along a beam path of the thermal radiation extending from the object to the housing, and
      comprising a digital enhancement of the image based on the characteristic of the beam.

2. The system of claim 1, wherein the detector comprises an uncooled microbolometer array.

3. The system of claim 1, wherein the detector comprises an array of heat-sensitive pixels.

4. The system of claim 1, wherein the detector comprises a first array of pixels and the display comprises a second array of pixels corresponding to the first array of pixels.

5. The system of claim 4, further comprising a readout integrated circuit, the readout integrated circuit being configured to control operation of at least one pixel of the second array of pixels.

6. The system of claim 5, wherein the display modifies at least one of a color, contrast, brightness, or gain of the at least one pixel in response to receipt of the output signal from the controller.

7. The system of claim 6, wherein the display temporally modulates operation of the at least one pixel in response to receipt of the output signal.

8. The system of claim 1, wherein the characteristic of the beam comprises a predetermined characteristic.

9. The system of claim 8, wherein:
  the predetermined characteristic comprises temporal modulation.

10. The system of claim 1, wherein the controller comprises a first controller disposed within the housing, the system further including a second controller operably connected to the display and disposed external to the housing, the second controller being configured to control the display to display the image based on information received from the first controller.

11. A method, comprising:
  controlling, with a controller, emission of a beam of thermal radiation, via an orifice defined by a housing, and toward an object disposed at a location external to the housing;
  receiving, via the orifice, at least part of the thermal radiation at an optics assembly;
  identifying, by a detector coupled to the optics assembly, the at least part of the thermal radiation received by the optics assembly, the detector having a field of view;
  providing, by the detector, an input signal to the controller based on the identified at least part of the thermal radiation;
  generating, by the controller, an output signal, the output signal being based on:
    the input signal, and
    a characteristic of the beam of thermal radiation, as emitted from the housing, determined independent of the at least part of the thermal radiation;
  providing, by the controller, the output signal to a display operably connected to the controller; and
  displaying, by the display, an image based on the output signal, the image illustrating:
    the object, and a point of impact of the beam on the object, in accordance with the input signal, and
    a visual representation of the beam of thermal radiation emitted from the housing, the visual representation:
      being illustrated in the image as passing, from the object, at least partly along a beam path of the thermal radiation extending from the object to the housing, and
      comprising a digital enhancement of the image based on the characteristic of the beam.

12. The method of claim 11, further comprising modifying, by the display, at least one of a color, contrast, brightness, or gain of at least one pixel in response to receipt of the output signal from the controller.

13. The method of claim 12, further comprising temporally modulating, by the display, operation of the at least one pixel in response to receipt of the output signal.

14. The method of claim 11, wherein the characteristic of the beam comprises a predetermined characteristic.

15. The method of claim 14, wherein the orifice defined by the housing is outside of field of view of the detector, and the optical axis of the detector is colinear with a central optical axis of the optics assembly.

16. A system, comprising:
  a housing comprising an orifice;
  a controller configured to control emission of a beam of thermal radiation from the housing, via the orifice, and toward an object disposed at a location external to the housing;
  a mounting component configured to removably attach the housing to an apparatus external to the housing;
  an optics assembly supported by the housing and having a central optical axis, the optics assembly configured to receive at least part of the thermal radiation via the orifice;
  a detector disposed within the housing and having an optical axis that is colinear with the optical axis of the optics assembly, the detector having a field of view and including a first plurality of pixels controlled to identify the at least part of the thermal radiation received by the optics assembly, and to provide an input signal to the controller based on the identified at least part of the thermal radiation; and
  a display connected to the housing and including a second plurality of pixels, the controller being configured to:
    generate an output signal, the output signal being based on:
      the input signal, and
      a characteristic of the beam of thermal radiation, as emitted from the housing, determined independent of the at least part of the thermal radiation, and
    provide the output signal to the display, the display being configured to display an image based on the output signal, the image illustrating:
      the object, and a point of impact of the beam on the object, in accordance with the input signal, and
      a visual representation of the beam of thermal radiation emitted from the housing, the visual representation:

being illustrated in the image as passing, from the object, at least partly along a beam path of the thermal radiation extending from the object to the housing, and comprising a digital enhancement of the image based on the characteristic of the beam.

17. The system of claim 16, wherein the mounting component comprises a locking assembly or a clamping mechanism configured to removably attach the housing to a rail of the apparatus.

18. The system of claim 16, wherein the housing is substantially fluid-tight, and wherein the characteristic of the beam comprises a predetermined characteristic.

19. The system of claim 16, further comprising:
a power source operably connected to the controller and to the detector.

20. The system of claim 16, wherein the detector comprises an uncooled microbolometer array.

21. The system of claim 16, wherein the detector comprises an array of heat-sensitive pixels.

22. The system of claim 16, wherein
one or more pixels of the display are digitally enhanced based on one or more of color-coding or temporal modulation.

* * * * *